United States Patent
Creger

Patent Number: 5,947,242
Date of Patent: Sep. 7, 1999

[54] ELECTROHYDRAULIC CONTROL DEVICE FOR A DRIVE TRAIN OF A MACHINE

[75] Inventor: Todd D. Creger, Metamora, Ill.

[73] Assignee: Caterpillar Inc., Peoria, Ill.

[21] Appl. No.: 08/923,898

[22] Filed: Sep. 4, 1997

[51] Int. Cl.⁶ ................................................. B60K 41/28
[52] U.S. Cl. .................. 192/3.23; 192/3.25; 192/3.3; 192/221; 74/733.1
[58] Field of Search .................... 192/3.23, 3.24, 192/3.25, 3.26, 3.27, 3.28, 3.29, 3.3, 218, 221, 13 R; 74/732.1, 733.1

[56] References Cited

U.S. PATENT DOCUMENTS

| | | | |
|---|---|---|---|
| 3,901,030 | 8/1975 | Wonn | 60/341 |
| 4,066,157 | 1/1978 | Gibbs | 192/3.24 |
| 4,321,990 | 3/1982 | Koch, Jr. | 192/13 R |
| 5,040,648 | 8/1991 | Mitchell et al. | 192/3.58 |
| 5,456,333 | 10/1995 | Brandt et al. | 180/336 |
| 5,509,520 | 4/1996 | Evans et al. | 192/3.23 |
| 5,613,581 | 3/1997 | Fonkalsrud et al. | 192/3.23 |

*Primary Examiner*—Charles A Marmor
*Assistant Examiner*—Saul J. Rodriguez
*Attorney, Agent, or Firm*—David M. Masterson

[57] ABSTRACT

An electrohydraulic control device for a drive train of a machine is disclosed. The machine includes an engine, a torque converter having an impeller element, a reactor element and a turbine element, an impeller clutch drivingly connected between the engine and the impeller element, and a set of service brakes. An impeller brake is drivingly connected between the impeller element and a stationary support member. A controller receives at least one input signal representing an operation of the drive train and responsively controls one of the impeller clutch, impeller brake and brake set.

7 Claims, 2 Drawing Sheets

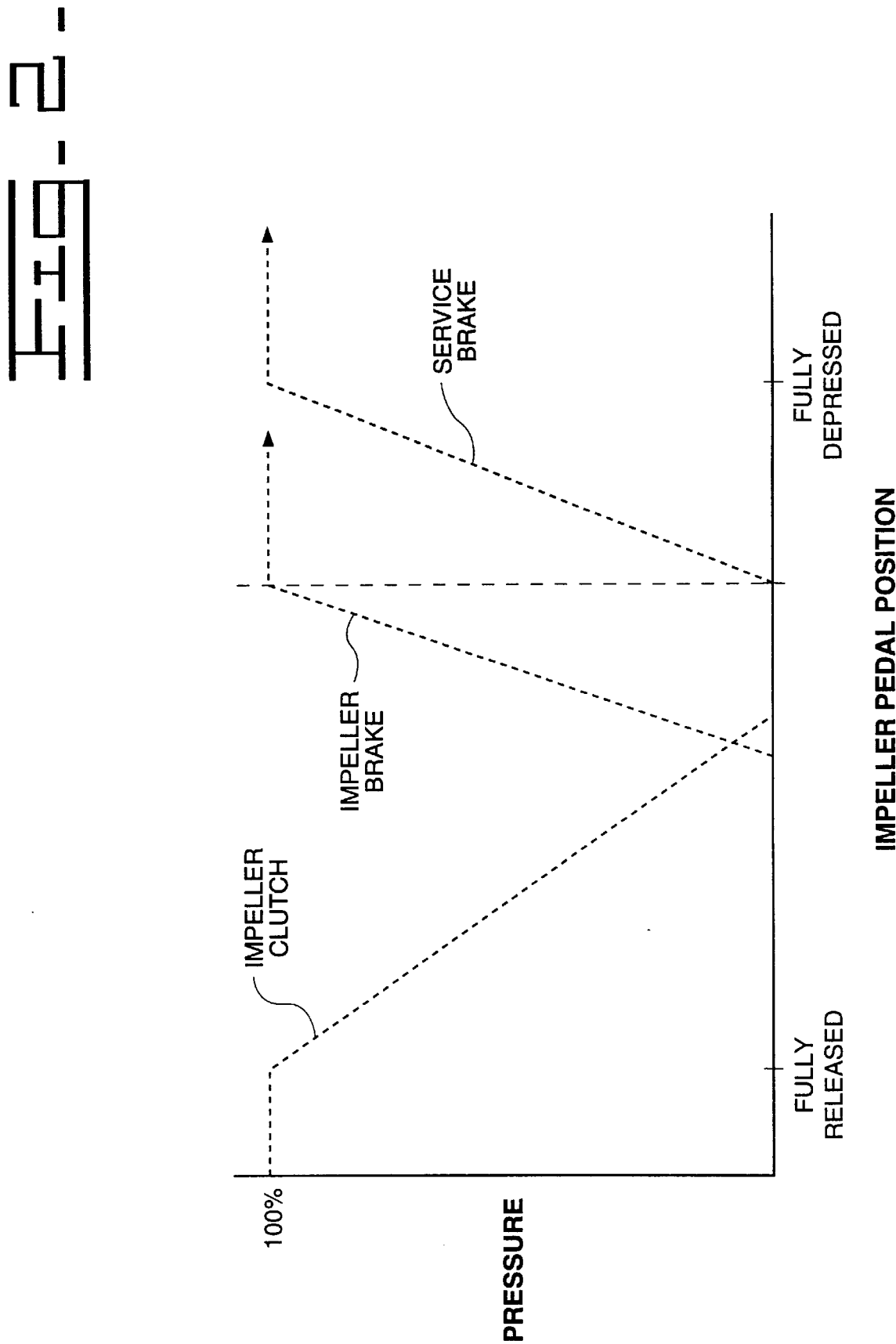

ELECTROHYDRAULIC CONTROL DEVICE FOR A DRIVE TRAIN OF A MACHINE

TECHNICAL FIELD

The present invention relates generally to an electrohydraulic control device and method for controllably operating a drive train of a machine, and more particularly to an electrohydraulic control device that retards the rotation of the drive train via a torque converter impeller brake.

BACKGROUND ART

In one conventional mode of "inching" a machine, the transmission is kept in gear and the brakes are manually modulated by use of a foot pedal. This is undesirable because it requires considerable operator effort and because the service brakes experience a relatively rapid rate of wear. In another well known mode, when the machine's service brakes are applied by the depression of a foot pedal, an associated disc and plate type transmission clutch is caused to slip so that the transmission is substantially neutralized. This is most often accomplished by the brake system fluid circuit acting upon an "inching" valve disposed between a pressure source and the clutch, as has been widely used in shuttle-type lift trucks. This is desirable since the machine's ground speed is reduced for more precise control, while the speed of the engine is maintained at a relatively high rate to enable a rapid response of the auxiliary equipment operated by the engine. However, controlled slip at a fixed setting of the manually operated control member in both of these modes of operation has heretofore been impractical.

In another conventional method of providing inching capabilities to a machine, an impeller clutch connected between a machine's engine and transmission is provided. Typically, the impeller clutch is actuated through an impeller pedal. Upon depression of the impeller pedal, the impeller clutch leaves an engaged state where the full amount of power is transmitted from the engine to the transmission to a disengaged state where the engine power is variably passed to the transmission based on the amount of pedal depression. Upon further depression of the impeller, the impeller clutch decouples the engine from the transmission and the service brakes are engaged to slow the speed of the machine. However, because the drive line is decoupled from the engine, engine friction retarding will be lost; thereby, imposing higher braking energy requirements on the service brakes. This may cause overheating of the brakes, which reduces brake life.

The present invention is directed to overcoming one or more of the problems as set forth above.

DISCLOSURE OF THE DRAWINGS

An electrohydraulic control device for a drive train of a machine is disclosed. The machine includes an engine, a torque converter having an impeller element, a reactor element and a turbine element, an impeller clutch drivingly connected between the engine and the impeller element, and a set of service brakes. An impeller brake is drivingly connected between the impeller element and a stationary support member. A controller receives at least one input signal representing an operation of the drive train and responsively controls one of the impeller clutch, impeller brake and brake set.

BRIEF DESCRIPTION OF THE DRAWINGS

For a better understanding of the present invention, reference may be made to the accompanying drawings in which:

FIG. 2 shows a graph illustrating the pressure associated with the impeller clutch, an impeller brake, and service brake set versus the position of an impeller clutch pedal.

BEST MODE FOR CARRYING OUT THE INVENTION

Figure 1:
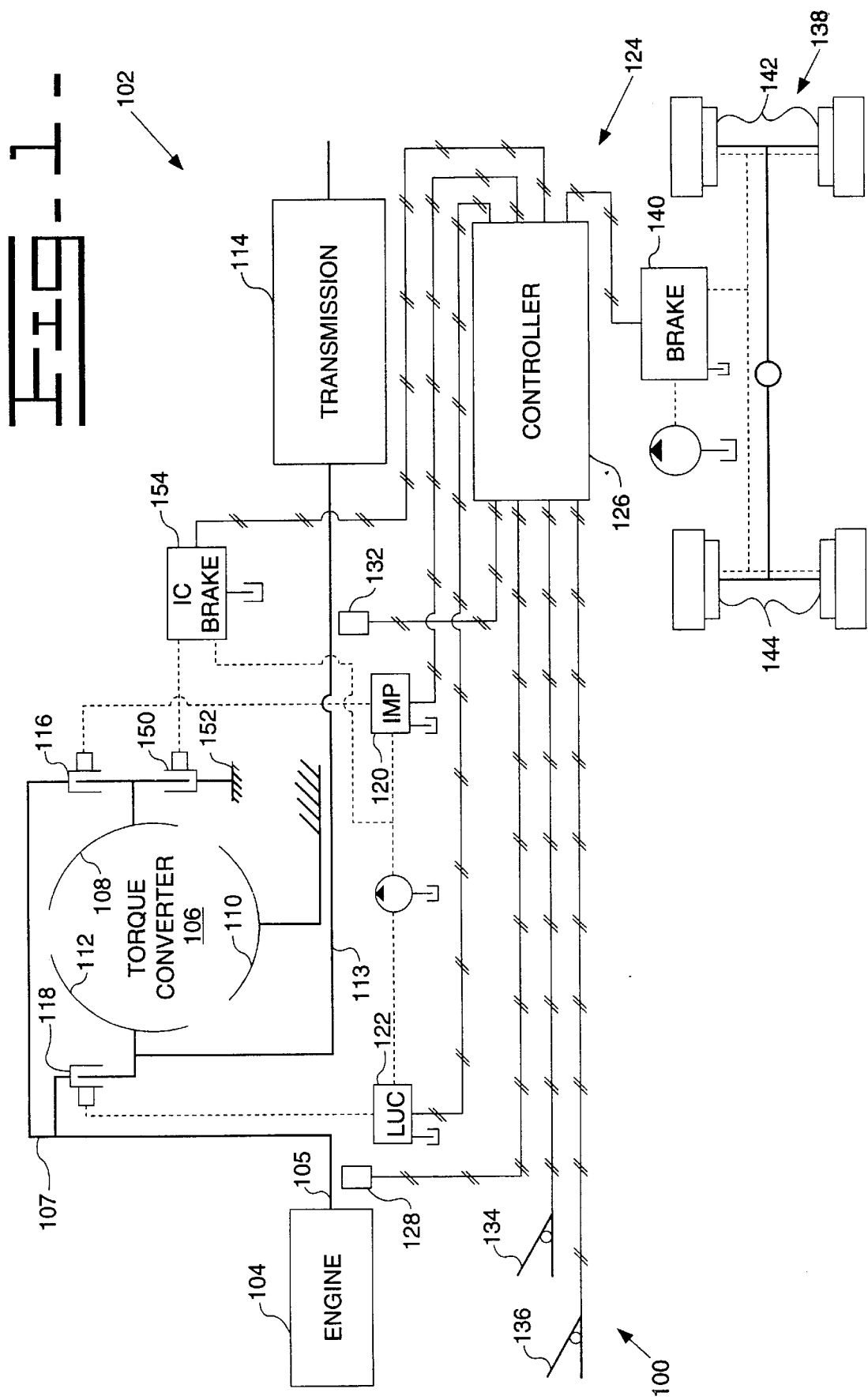
FIG. 1 is a schematic view of an electrohydraulic drive system of a machine, including an impeller clutch, impeller brake, and a set of service brakes.

The present invention is directed toward controlling the ground speed of an earth working machine 100, such as a wheel loader, for example. A drive train 102 for the machine is illustrated in FIG. 1. The drive train 102 includes an engine 104 having a shaft 105 connected to a hydrodynamic torque converter 106. The torque converter 106 includes, a rotating housing 107, an impeller element 108, a reactor element 110, and a turbine element 112 connected to a centrally located output shaft 113. The output shaft 113 provides the input to a multi-speed transmission 114 that includes a plurality of interconnected planetary gear sets selectively engaged in cooperating groupings by operation of a pair of disc-type directional clutches or brakes and a plurality of disc-type speed clutches or brakes.

The drive train 102 also includes a disc-type input clutch or impeller clutch 116 located between the engine 104 and the torque converter 106 for controllably coupling the rotating housing 107 to the impeller element 108, and a disc-type lockup clutch 118 for selectively coupling the rotating housing 107 to the turbine element and 112 the output shaft 113 for a direct mechanical connection that effectively bypasses the torque converter 106. An electrohydraulic impeller clutch valve 120 provides fluid flow to actuate the impeller clutch 116, while an electrohydraulic lockup clutch valve 122 provides fluid flow to actuate the lockup clutch 118. An electrohydraulic brake valve 140 provides fluid flow pressure to actuate a front and rear sets of brakes 142,144.

Advantageously, in accordance with the present invention, an impeller brake 150 is drivingly connected between the impeller element 108 and a stationary support member 152. The impeller brake 150 is used to provide braking capabilities to the machine 100. An electrohydraulic impeller brake valve 154 provides fluid pressure to actuate the impeller brake 150 by engaging and disengaging the impeller brake 150 from the stationary support member 152.

An electrohydraulic control device 124 is provided to control the operation of the drive train 102. The control device 124 includes an electronic controller 126 that preferably contains an internal microprocessor. The term microprocessor is meant to include microcomputers, microprocessors, integrated circuits and the like capable of being programmed. The controller 126 contains sufficient electronic circuitry to convert input signals from a plurality of sensors and switches to a form readable by the microprocessor, and circuitry to generate sufficient power to drive a plurality of solenoids for actuating the transmission 114, the impeller clutch 116, impeller brake 150 and the lockup clutch 118 according to command signals produced by the controller 126.

The controller 126 receives input signals pertaining to the operation of the drive train 102, including the engine speed, ground speed, and positions of a break pedal 134 and an impeller pedal 136. For example, an engine speed sensor 128 is mounted on a stationary portion of the drive train 102 for providing a signal proportional to the rotational speed of the engine shaft 105. A torque speed sensor 132 produces a signal corresponding to the rotational speed and direction of the torque converter output shaft 113 The torque converter speed signal is indicative of the ground speed of the machine 100.

The service brake pedal 134 is provided for manually operating the front and/or rear brake sets 142,144 in a well known manner. The service brake pedal 134 is moveable between a minimum and maximum position for producing a brake signal indicative of the position of the service brake pedal 134.

The impeller pedal 136 is provided for selectively controlling the degree of engagement of the impeller clutch and brake 116,150. As the impeller pedal 136 is depressed from a fully released position to an intermediate position, the ability of the impeller clutch 116 to transmit torque to the impeller element 108 from the engine 104 is proportionately reduced. When depressed, the impeller pedal 136 generates an impeller control signal to the controller 126 proportional to the position of the impeller pedal 136. Advantageously, braking of the machine 100 may be initiated not only through the service brakes 142,144, in response to the impeller pedal 136 being depressed, but additionally through the impeller brake 150. When the impeller pedal 136 is fully released, the impeller clutch 116 is full engaged to transfer the fully amount of torque from the engine 104 to the transmission 114, and the service brakes 142,144 and impeller brake 150 are fully disengaged.

The controller 126 modulates the impeller clutch 116, service brakes 142,144 and impeller brake 150 in response to the depression of the impeller pedal 136. Reference is now made to the graph shown in FIG. 2 which illustrates the impeller clutch and impeller brake pressures, as well as, the service brake pressure as a function of the impeller pedal 136 depression. For example, as the impeller pedal is depressed from a fully released first position 156 to an intermediate second position 158, the controller 126 adjusts the pressure supplied to the impeller clutch 116 pressure proportionally. Depression of the impeller pedal 136 causes it to be positioned beyond to a third position 160, progressively adjusting the pressure supplied to the impeller brake 150. Depression of the impeller pedal 136 beyond a fourth position 162, progressively adjusting the pressure supplied to the service brakes 142,144. Thus, the controller 126 of the present invention provides for the torque converter 106 to control the retardation of the drive train 102, along with the service brakes 142,144, to slow the speed of the machine 100. Note that the illustrated curves in FIG. 2 are exemplary and the amount of overlap between the impeller clutch and impeller brake pressures, and impeller brake and service brake pressures are modifiable based on the desired drive line performance. Further note that, the impeller brake 150 and service brake 142,144 pressures may additionally be a function of the engine speed, ground speed, and impeller clutch pressures.

Industrial Applicability

With respect to the drawings and in operation, the present invention provides for a ground speed control of a machine 100 while the engine 104 is running at high idle. More specifically, the electrohydraulic control device 124 controllably actuates the impeller clutch 116, impeller brake 150 and service brakes 142,144 to control the ground speed of the machine 100 in response to the impeller clutch pedal 136 position. For example, the operator can depress the impeller pedal 136 to decouple the engine 104 from the drive train 102. This provides the operator with precise control when moving slowly into a pile of material, referred to as "inching", while providing full engine power to a hydraulic system that controls a machine implement. However, because many operators use the impeller pedal 136 to slow the machine 100 from high speeds to low "inching" speeds, the present invention provides for the drive train 102 to retard the speed of the machine 100 through an impeller brake 150. By using the impeller brake 150 in conjunction with the service brakes 142,144, the speed of the machine 100 can be controlled in a manner that provides for improved life of drive train 102 components.

Other aspects, objects and advantages of the present invention can be obtained from a study of the drawings, the disclosure and the appended claims.

I claim:

1. An electrohydraulic control device for a drive train of a machine including an engine, a torque converter having an impeller element, a reactor element and a turbine element, an impeller clutch drivingly connected between the engine and the impeller element, and a set of service brakes, comprising:

an impeller brake drivingly connected between the impeller element and a stationary support member;

a controller adapted to receive at least one input signal representing an operation of the drive train and generate command signals in response thereto;

an impeller clutch electrohydraulic valve adapted to provide fluid flow to the impeller clutch to controllably engage and disengage the impeller clutch from the impeller element;

an impeller brake electrohydraulic valve adapted to provide fluid flow to the impeller brake to controllably engage and disengage the impeller brake from the stationary support member; and a service brake electrohydraulic valve adapted to provide fluid flow to the brake set to controllably engage and disengage the brake set, wherein the command signals cause the actuation of one of the impeller clutch electrohydraulic valve, the impeller brake electrohydraulic valve, and the service brake electrohydraulic valve.

2. An electrohydraulic control device, as set forth in claim 1, including:

an impeller pedal being moveable between a fully released and fully depressed position for producing an operator impeller signal indicative of the position of the impeller pedal;

a service brake pedal being moveable between a minimum and maximum position for producing a brake signal indicative of the position of the service brake pedal.

3. An electrohydraulic control device, as set forth in claim 2, wherein the controller receives the brake signal and delivers a command signal to the service brake electrohydraulic valve to controllably actuate the service brake electrohydraulic valve solely in response the position of the brake pedal.

4. An electrohydraulic control device, as set forth in claim 3, wherein the controller receives the operator impeller signal and delivers a command signal to one of the impeller clutch electrohydraulic valve, the impeller brake electrohydraulic valve, and the service brake electrohydraulic valve to controllably actuate the respective electrohydraulic valve in response the position of the impeller pedal.

5. An electrohydraulic control device, as set forth in claim 4, wherein the controller adjusts pressure supplied to the impeller clutch proportional to the impeller pedal position in response to the impeller pedal being depressed from a first position to a second position, adjusts pressure supplied to the impeller brake in response to the impeller pedal being depressed beyond a third position, and adjusts pressure supplied to the service brake in response to the impeller pedal being depressed beyond a fourth position.

6. An electrohydraulic control device, as set forth in claim 5, wherein pressure is supplied to both the impeller clutch and the impeller brake when the impeller pedal between the second position and the third position.

7. An electrohydraulic control device, as set forth in claim 5, wherein pressure is supplied to both the impeller brake and the service brake when the impeller pedal depressed beyond the fourth position.

* * * * *